US012718572B2

(12) United States Patent
Ooi et al.

(10) Patent No.: US 12,718,572 B2
(45) Date of Patent: Aug. 25, 2026

(54) AUDIBLE NOTIFICATION MODE OF OPERATION FOR VIDEO CAMERA DEVICE

(71) Applicant: MOTOROLA SOLUTIONS, INC., Chicago, IL (US)

(72) Inventors: Chun Wen Ooi, Georgetown (MY); Wei Lun Chan, Simpang Ampat (MY); Wooi Ping Teoh, Tanjung Tokong (MY); Tejeash Duraimanickam, Lunas (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 132 days.

(21) Appl. No.: 18/628,170

(22) Filed: Apr. 5, 2024

(65) Prior Publication Data

US 2025/0316086 A1 Oct. 9, 2025

(51) Int. Cl.

| | |
|---|---|
| ***G06T 7/70*** | (2017.01) |
| ***G06V 20/40*** | (2022.01) |
| ***G06V 20/52*** | (2022.01) |
| ***G08B 21/10*** | (2006.01) |
| ***G08B 25/00*** | (2006.01) |

(52) U.S. Cl.

CPC ................ *G06V 20/52* (2022.01); *G06T 7/70* (2017.01); *G06V 20/44* (2022.01); *G08B 21/10* (2013.01); *G08B 25/00* (2013.01)

(58) Field of Classification Search

CPC .......... G06T 7/70; G06V 20/44; G08B 21/10; G08B 25/00

USPC .................................. 348/346, 169, 180, 61

See application file for complete search history.

(56) References Cited

U.S. PATENT DOCUMENTS

| | | | | |
|---|---|---|---|---|
| 7,839,290 | B2 | 11/2010 | Chidakel et al. | |
| 9,374,673 | B2 | 6/2016 | Mendelson | |
| 2016/0203694 | A1 * | 7/2016 | Högasten ............. | G08B 21/043 348/164 |
| 2017/0223302 | A1 * | 8/2017 | Conlan ........... | G08B 13/19695 |

FOREIGN PATENT DOCUMENTS

| | | | |
|---|---|---|---|
| JP | 6664150 | B2 | 3/2020 |
| WO | 2019086930 | A1 | 5/2019 |

* cited by examiner

*Primary Examiner* — Daquan Zhao

(57) ABSTRACT

A device, system and method for facilitating communication to trapped victims due to an emergency incident are described. A camera detects an emergency incident at a location. The camera switches a mode of a camera to a notification mode based on the emergency incident. The camera determines that a person is within a vicinity of the location. The status of the person is determined by audible feedback associated with the emergency incident that is sensed by the camera. The camera determines a presence of rescuers based on the audible feedback or a rescue signal sensed by the camera, which is associated with emergency incident rescue object or event. In the notification mode, the camera generates an output indicative of the status.

20 Claims, 7 Drawing Sheets

400

FIG. 5A
500
530
PUBLIC-SAFETY NETWORK
540
VIDEO SURVEILLANCE SYSTEM
501
502
WORKFLOW SERVER
550
RADIO SYSTEM
561
NETWORK
560
GATEWAY
562
563
IOT
563
IOT
563
IOT DEVICE

AUDIBLE NOTIFICATION MODE OF OPERATION FOR VIDEO CAMERA DEVICE

BACKGROUND OF THE INVENTION

Responding to an emergency large scale disaster may require facilitating communications and responses to first responders that may otherwise be difficult to contact. For example, during an emergency incident that causes victims to be trapped such as a building collapse in an earthquake, it can be very challenging for first responders or rescuers to locate the victims. Moreover, it is possible that shouting to announce their presence is dangerous for victims (e.g., due to risk of inhalation of dangerous contaminants) or victims are unconscious. A method or device to alert such first responders or rescuers of victims who find it challenging to indicate that they are trapped could improve the detection and rescue of victims trapped by the rubble from earthquakes or by other large scale disasters.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
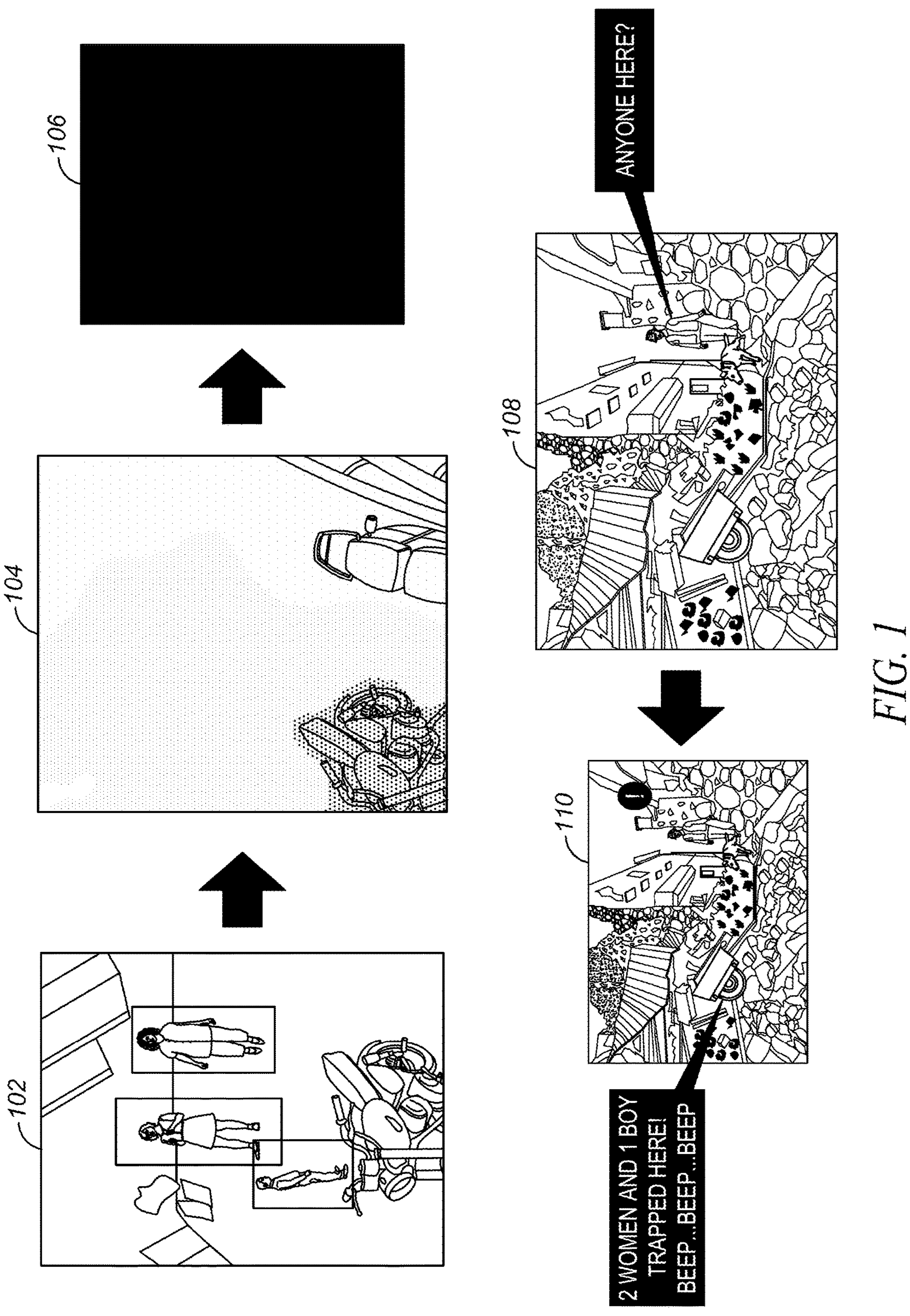
FIG. 1 depicts a flow diagram illustrating operation of a camera device in an emergency notification mode of operation, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

It may be challenging to facilitate assistance to people and/or objects when an emergency incident occurs. For example, when a disaster such as a building collapse, an earthquake, a tornado, a hurricane, a flood, a tsunami, a storm, an airstrike or bomb during a war or other type of destructive military operation and/or the like occurs, a building in a location affected by the emergency incident/disaster can collapse. In such a situation, people may be trapped by building rubble resulting from a building collapse. Although fortunately some people may have escaped the building collapse successfully, those people that are trapped would be in need of emergency assistance including a potential rescue attempt. Rescue efforts are often particularly challenging in a building collapse environment for several reasons, including coordination of rescue efforts as well as determination of the status and location of trapped people or victims needing assistance. It may be desirable to improve rescue efforts such as via an improved manner of determining and indicating the status and location of trapped victims, critical assets, or those in need of assistance.

The present disclosure provides a technical solution to the particular technical challenges of providing communication devices that support rescue efforts in emergency situations such as the building collapse and trapped victim scenarios described herein. Communication devices used for assisting trapped victims or those needing help must operate in a limited power environment in which both determination of who needs help and communicating with rescuers can be particularly challenging. For example, a trapped victim could become unconscious and be unable to provide an indication of their location and/or status when first responders are nearby. Conventionally, trapped people who are trapped in an earthquake induced building collapse might attempt to signal rescuers by tapping on a pipe or wall, for example. Often, this can be an ineffective way to alert rescuers to a trapped victim's location. Moreover, if the trapped victim shouts as a last resort to gain a rescuer's attention, the trapped victim may inadvertently inhale dangerous amounts of dust, which poses an additional health hazard to the trapped victim.

Also, the trapped victim could become unconscious and may be unable to provide an indication of their status and location to any first responders in the vicinity capable of helping the trapped victim. As such, the communication device and system of the present disclosure may be beneficial for addressing the technical challenges inherent in alerting first responders to trapped victims during a search and rescue operation, including trapped victims under building rubble who cannot readily be seen by first responders. The present disclosure advantageously discloses operation of a video camera in a SOS notification mode that can notify first responders to the presence of trapped victims, including those that are unconscious and cannot call for help as well as those whose calls for help cannot be heard by first responders due to being trapped. Moreover, the camera operating in SOS notification mode can output an indication of the status and location of trapped victims based on audio information (e.g., audio pattern, audible feedback, etc.) detected by the camera. The camera can switch to the low power usage SOS notification mode after detecting a building collapse, for example, based on video analytics or a building collapse signal that indicates the potential existence of trapped victims. In other words, the camera may determine it can no longer operate in an image capture mode of operation, such as due to obstructed visual conditions and damage and/or loss of power due to the occurrence of the emergency situation.

As described through the present disclosure, the camera switching to operate in the SOS notification mode upon determination of a building collapse or other trapped victim emergency scenario can improve detection of trapped people in this emergency context. As such, the present disclosure addresses the technical challenges of providing adequate communication to save lives and rescue those in need of help during emergency incidents that trap people and/or objects. In particular, the present disclosure provides a technical solution for detecting rescue events and/or rescue related sounds or images to trigger switching the camera to the SOS notification mode to improve search, rescue, and assistance efforts for survivors and other trapped people or objects in need of assistance or immediate action. Furthermore, the camera may provide a survival guide to those who are trapped and inform them that the camera can alert first responders to their presence for help.

According to one embodiment of the present disclosure, a computer-implemented method for facilitating communication to trapped victims due to an emergency incident is provided. The method includes detecting an emergency incident at a location. The method also includes switching, based on the emergency incident, a mode of a camera to a notification mode. The method also includes determining that a person is within a vicinity of the location. The method also includes determining, based on an audible feedback associated with the emergency incident that is sensed by the camera, a status of the person. The method also includes determining, based on the audible feedback or a rescue signal sensed by the camera, a presence of rescuers. The audible feedback or the rescue signal is associated with the emergency incident rescue object or event. The method includes generating, by the camera in the notification mode, an output indicative of the status.

In accordance with one example embodiment of the present disclosure, a system is provided including a processor configured to perform a method for facilitating communication in a constrained environment due to an emergency incident. The system includes: a sensor configured to output a building collapse signal indicative of an emergency incident at a location; a first responder device configured to generate a rescue signal indicating a presence of a rescuer at the location; and a camera comprising a processor and communicatively coupled to the sensor and the first responder device. The method also includes switching, based on the building collapse signal, a mode of a camera to a notification mode. The method also includes determining that a person is within a vicinity of the location. The method also includes determining, based on an audible feedback associated with the emergency incident that is sensed by the camera, a status of the person. The method also includes determining, based on the audible feedback and the rescue signal, whether the person is trapped at the location and the rescuer is within a threshold distance of the person. The method includes generating, by the camera in the notification mode, an output indicative of the status and whether the person is trapped.

In accordance with one example embodiment of the present disclosure, a camera including a processor and a computer-readable storage medium is provided including instructions (e.g., stored sequences of instructions) that, when executed by the processor, cause the processor to perform a method for facilitating communication to trapped victims due to an emergency incident. The method includes detecting an emergency incident at a location. The method also includes switching, based on the emergency incident, a mode of a camera to a notification mode. The method also includes determining that a person is within a vicinity of the location. The method also includes determining, based on audio or video information associated with the emergency incident that is sensed by the camera, a status of the person. The audio or video information is associated with the emergency incident rescue object or event. The method includes generating, by the camera in the notification mode, an output indicative of the status.

Each of the above-mentioned embodiments will be discussed in more detail below, starting with example system and device architectures of the system in which the embodiments may be practiced, followed by an illustration of processing blocks for achieving an improved technical communication or data processing based method, device, and system for supporting rescue efforts in a building collapse scenario.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus that may be on or off-premises, or may be accessed via cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions, which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the drawings.

FIG. 1 depicts a flow diagram 100 illustrating operation of a camera device in an emergency notification mode of operation, in accordance with some examples. The flow diagram 100 includes an image 102 that depicts the camera device performing video analytics including object detection. For example, the camera device may be a video camera closed circuit television (CCTV) device that executes an object detection algorithm to detect and identify objects and people in its field of view. The video camera device can capture video in the field of view continuously while in operation, which may be for a specific period of time or as long as the video camera device is powered on. In this way, the video camera device may identify and store indications of people and objects appearing in the field of view in its on device and/or cloud based memory. The identification can be based on any suitable video detection and semantic analysis algorithm, which can optionally include a machine learning (ML) or artificial intelligence (AI) component and may be implemented by the processor of the camera.

Accordingly, the image 102 depicts that a plurality of people were previously identified and that their respective identities were stored in memory. That is, the camera device may determine and remember the identity of people previously captured in video footage as well as the relative location of those identified people, such as a proximate distance or room relative to a collapsed building. As shown in the image 102, the identities and locations of three individuals were captured on video and stored in memory. The stored identity and location can be used for subsequent search, assistance, and rescue efforts if necessary. To this end, the image 104 shows a video indication of an emergency incident such as a building collapse. The video camera device may determine the existence of the building collapse based on the existence of dust clouds, rubble dust falling down, or something similar. The image 104 depicts a cloud of rubble/dust surrounding two motorcycles which indicates the occurrence of the building collapse and the potential existence of trapped victims or victims requiring assistance. The video camera device can correlate the location of the rubble from the collapse building with the presence/location of victims or other critical assets who were previously located at the corresponding location, such as the three individuals identified in the image 102.

The video camera device can subsequently support rescue efforts by switching in a SOS notification mode of operation. When the video camera is a SOS notification device, it can inform potential rescuers of the location and status of trapped victims that require rescue or assistance as well as critical assets/objects that it may be desirable to retrieve. For example, the video camera device can transition from a normal mode of operation to the SOS notification mode of operation when a building collapse scenario is detected. That is, the video camera device may determine when it is no longer feasible to operate in an image capture mode of operation and automatically transition to the notification mode of operation based on detecting the building collapse or emergency incident situation. In the SOS notification mode of operation, the video camera device may generate audible sound at a cadence configured to prolong the battery life of the video camera device.

The cadence and method of generating SOS sounds/beacons by the camera can be such as to preserve the usage of power in a limited power environment cause by the emergency incident. As an example, to account any potential delay in the arrival of rescuers to the area that the video camera device is located in, the video camera may only commence sending sonic beacons as SOS rings after the camera detects or hears survivor feedback or determines the presence of rescuers. Thus, the camera may prolong its useful battery life when rescuers have not yet arrived in the vicinity of any survivors or trapped victims that need assistance. The building collapse may be detected via video analytics and/or a received building collapse signal. Such video analytics or the building collapse signal can be based on video information that indicates the building collapse has occurred. In particular, the image 106 shows a black image that corresponds to rubble dust falling down in the field of view and causing the video footage of the video camera device to become a black or substantially dark/occluded image. That is, if the field of view of the video camera device appears as the image 106, that may trigger or constitute the receiving of a building collapse signal or video analytic based determination by the video camera device that the building collapse has occurred and presumably has affected the three individuals in the vicinity as previously captured on video and represented by the image 102.

In this way, the video camera device may determine that the three individuals of the image 102 are trapped victims and may proceed to assist them when rescuers or assistance has arrived. For example, as represented by the image 108, a microphone of the video camera device may listen for rescue object or rescue event related sounds and context. As an example, the microphone may be configured to recognize selected sounds or may learn to recognize such rescue associated sounds including a dog barking sound, an excavator sound, a chainsaw sound, a siren, a first responder name (e.g., someone shouting Red Cross), someone shouting a survivor's name, and/or the like. A set of rescue or survival related sounds such as the above can be pre-defined so that the video camera device can be configured to recognize and analyze such sounds to identify the context of a building collapse/emergency incident scenario. As an example, the image 108 depicts a first responder rescuer shouting and asking whether there is "anyone here" in order to locate any potential survivors of the emergency incident or victims requiring assistance. The camera microphone can capture and identify such audio to determine that rescuers are nearby looking for trapped victims needing help.

Moreover, the video camera device can be configured to search for a first responder device in the vicinity, such as via a Bluetooth low energy or other ad hoc wireless connection being formed between the camera and the first responder device. If the video camera device determines such as an ad hoc wireless connection has been established with any first responder device or that a rescue event or context has been established based on sensed audio information, then the video camera device may be configured to initiate an algorithm to help any potential trapped victims or critical assets that it previously identified, such as those depicted in the image 102 or otherwise previously identified and stored. The image 110 represents an example part of this algorithm, in which the video camera device is configured to generate an audio output indicating a number of trapped victims and their status if it is available. For example, the video camera device may generate audio output comprising a message of "two women and one boy are trapped here" and their corresponding health condition so that rescuers or first responders in the vicinity may be informed of the trapped people that need help.

In this way, rescuers in the vicinity could be timely informed of trapped victims, especially those victims who are unconscious or otherwise unable to shout for help (e.g., their shout cannot be heard through the rubble of the emergency incident induced building collapse). The video camera device can determine an improved manner of requesting help from rescuers by determining the condition of the trapped victims and a good manner/cadence of requesting help from any rescuers in the vicinity. Moreover, by providing a survival guide and audio interaction with trapped victims, the trapped victims can more calmly work through the emergency incident. Accordingly, the camera device in the emergency notification mode of operation provides a technical advantage to communication in rescue efforts including by informing rescuers of the presence of trapped victims needing assistance that the rescuers would not otherwise have known about.

Figure 2:
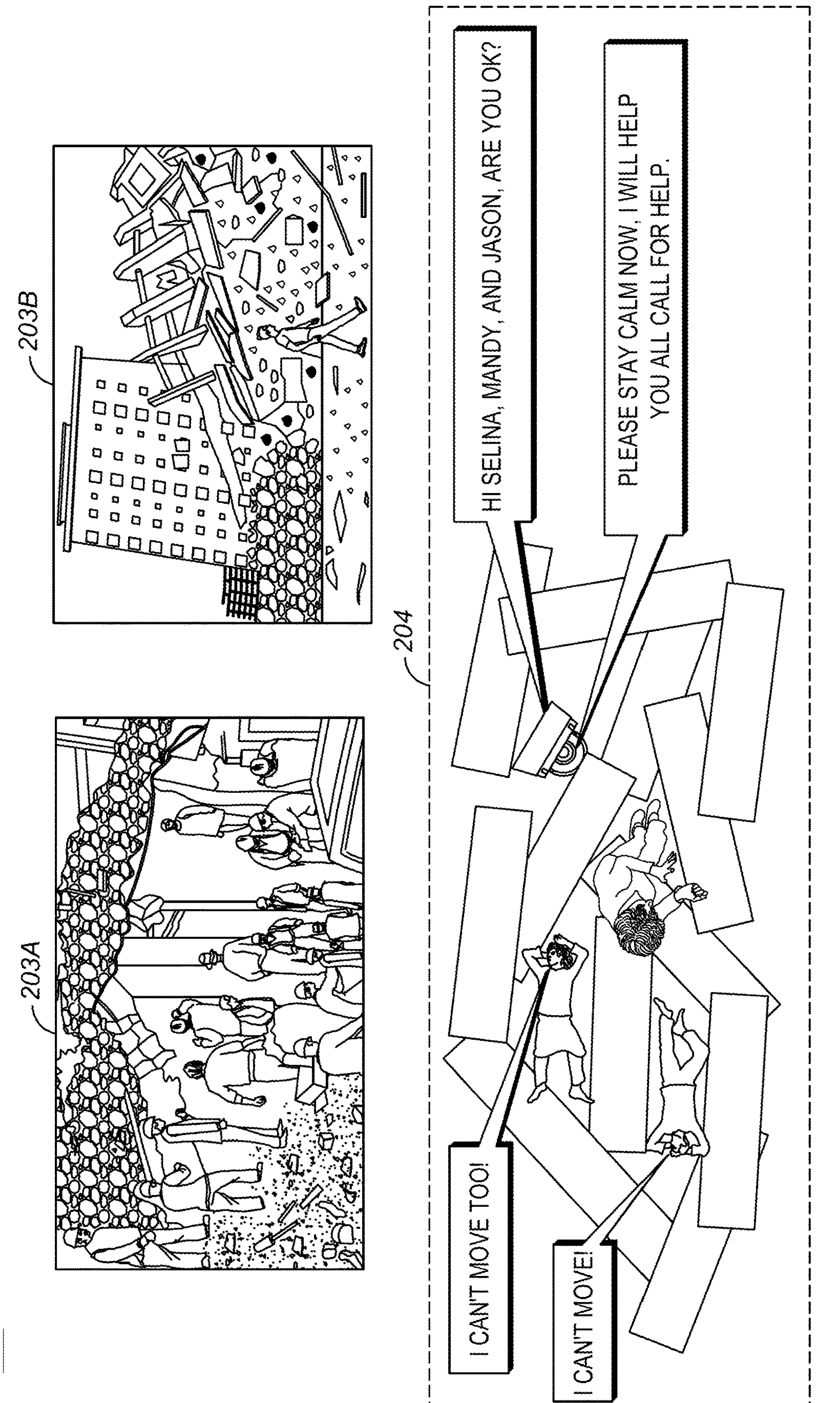
FIG. 2 depicts a representation of a building collapse or emergency incident causing objects to be trapped and a camera device operating in emergency notification mode to indicate the presence of trapped people and to assist the trapped people, in accordance with some examples.

FIG. 2 depicts a representation 200 of a building collapse or emergency incident causing objects to be trapped and a camera device operating in emergency notification mode to indicate the presence of trapped people and to assist the trapped people, in accordance with some examples. The images 203A-203B depict illustrations of example emergency incidents that cause the collapse of infrastructure. In particular, the image 203A shows the occurrence of an example building collapse resulting from an earthquake. The image 203B shows the presence of rubble and infrastructure damage caused by an example act of war, such as an airstrike. As discussed herein, an example workflow of the camera device operating in emergency notification mode such as similar to the flow diagram 100 of FIG. 1 can enable the camera device to assist trapped victims in requesting help when emergency incidents causing infrastructure collapse immobilize trapped victims such as depicted by image 204. To this end, the camera device may communicate with trapped victims to facilitate progression of rescue efforts. As an example, the camera device may generate audible speech that is understandable and perceptible by trapped victims in order to determine their respective status.

That is, the camera device may listen to and analyze captured audio feedback to determine the corresponding status of each of the trapped victims. For example, as illustrated in image 204, a voice assistant component of the camera device may output generated audio of a message such as "Hi Selina, Mandy, and Jason, are you okay?" The trapped victims Selina, Mandy, and Jason may then audibly indicate a response to the audio message prompt of the camera device. The responses of the trapped victims comprises user input that the camera device processor will analyze to determine an emergency response action. For example, the camera device may provide a survival guide comprising synthesized audio output of survival tips, emergency medical actions, body positioning, and/or the like. The camera device may also interpret the audio responses of the trapped victims to determine whether and how to request help on behalf of the trapped victims. As an example, Selina and Jason may verbally indicate "I can't move" which the camera device may semantically interpret as meaning they are immobilized trapped victims due to the infrastructure collapse caused by an existing emergency incident.

In contrast, the camera processor may be programmed to deduce that an absence of audio response and the prior capture of an individual prior to the infrastructure collapse means an unconscious trapped victim is present. Alternatively, this unconscious trapped victim determination may be based on an AI or ML algorithm. In general, the camera device may determine based on correlating a location of a previously stored object detection identification of Mandy (or another unconscious trapped victim) from prior to infrastructure collapse with the location of collapsing rubble or other indication of infrastructure (e.g., video analytics or building collapse signal as described herein) that Mandy is an unconscious trapped victim. That is, even though a trapped victim is unconscious and unable to provide feedback, the camera device can determine the unconscious trapped victim exists based on prior captured video footage (e.g., CCTV). This type of interaction between trapped victims and the camera device is illustrated by the example scenario of the image 204.

The camera device may also be configured to perform Bluetooth or other ad hoc wireless connection scanning for rescuer radios or communication devices for assisting the trapped survivors such as Selina, Mandy, and Jason in the image 204. The camera device may broadcast an audio summary of the survivor identities and corresponding status to any rescuer devices that it can establish a wireless connection or link with. In this way, rescuers can obtain useful information and details about the trapped survivors, such as their name, age, health condition, relevant photos, etc.

Figure 3:
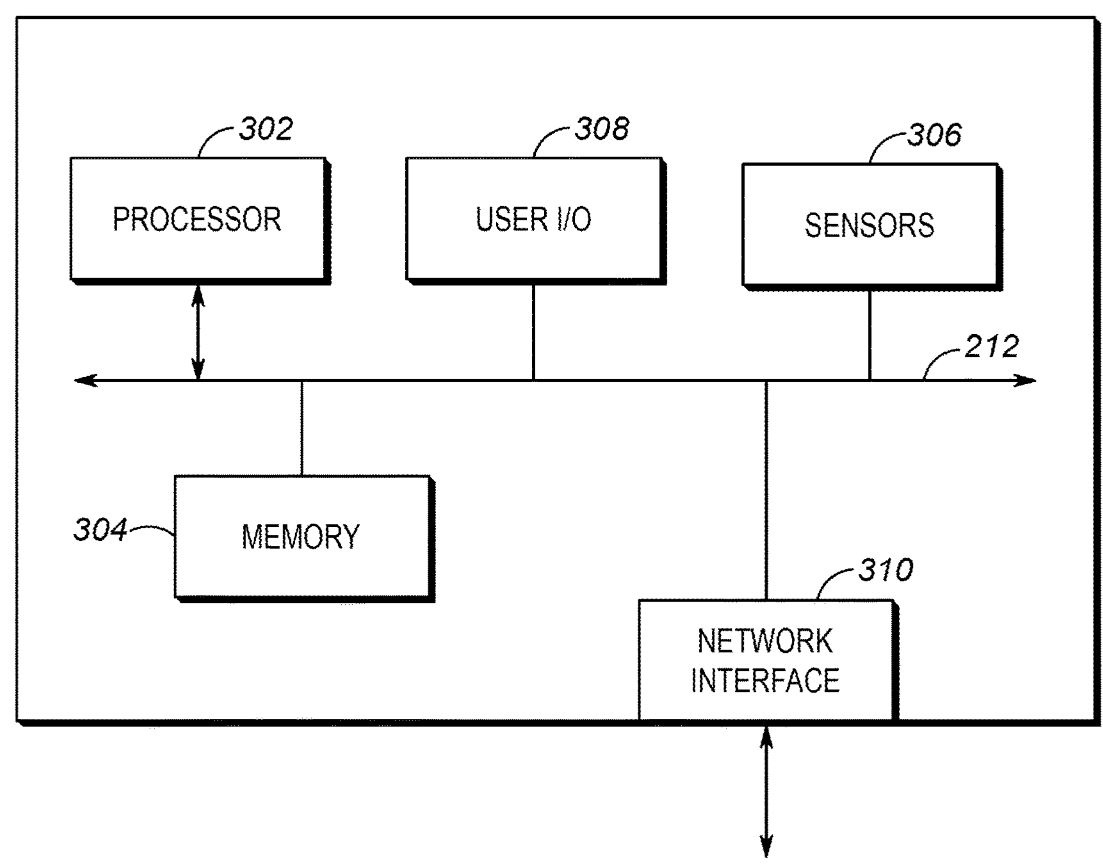
FIG. 3 illustrates a block diagram of an electronic device in accordance with some examples.

FIG. 3 illustrates a block diagram of a computer device 300 in accordance with some embodiments. In some embodiments, the computer device 300 may be a personal device, such as a UE, or a network device, or other equipment used in the network environment). The computer device 300 may include a physical device and/or a virtual device, such as a server running one or more virtual network functions (VNFs) of a network. In various examples, the computer device 300 may be a processor, a specialized computer, a personal or laptop computer (PC), a tablet PC, a mobile telephone, a smartphone, a network router, switch or bridge, a circuit such as an application specific integrated circuit (ASIC) or field programmable gate array (FPGA), or any machine capable of executing instructions (sequential or otherwise) that specify actions to be taken by that machine. In some embodiments, the computer device 300 may be an internet-of-things (IoT) or a narrowband IoT (NB-IoT) device or other device embedded within other, non-communication-based devices such as appliances or vehicles. The computer device 300 may render the user interface 100 (or similar UIs) for providing a security dashboard application that manages and improves building/school security.

The computer device 300 may include various components connected by a bus 312. The computer device 300 may include a hardware processor 302 such as one or more central processing units (CPUs) or other processing circuitry able to provide any of the functionality described herein when running instructions. The processor 302 may be connected to a memory 304 may include a non-transitory machine-readable medium on which is stored one or more sets of instructions. The memory 304 may include one or more of static or dynamic storage, or removable or non-removable storage, for example. A machine-readable medium may include any medium that is capable of storing, encoding, or carrying instructions for execution by the processor 302, such as solid-state memories, magnetic media, and optical media. The machine-readable medium may include, for example, Electrically Programmable Read-Only Memory (EPROM), Random Access Memory (RAM), or flash memory.

The instructions may enable the computer device 300 to operate in any manner thus programmed, such as the functionality described specifically herein, when the processor 302 executes the instructions. The machine-readable medium may be stored as a single medium or in multiple media, in a centralized or distributed manner. In some embodiments, instructions may further be transmitted or received over a communications network via a network interface 310 utilizing any one of a number of transfer protocols (e.g., frame relay, internet protocol (IP), transmission control protocol (TCP), user datagram protocol (UDP), hypertext transfer protocol (HTTP), etc.).

The network interface 310 may thus enable the computer device 300 to communicate data and control information (e.g., security information) with other devices via wired or wireless communication. The network interface 310 may include electronic components such as a transceiver that enables serial or parallel communication. The wireless connections may use one or more protocols, including Institute of Electrical and Electronics Engineers (IEEE) Wi-Fi 802.11, Long Term Evolution (LTE)/4G, 5G, Universal Mobile Telecommunications System (UMTS), or peer-to-peer (P2P), for example, or short-range protocols such as Bluetooth, Zigbee, or near field communication (NFC). Wireless communication may occur in one or more bands, such as the 800-900 MHz range, 1.8-1.9 GHz range, 2.3-2.4 GHz range, 60 GHz range, and others, including infrared (IR) communications. Example communication networks to which computer device 300 may be connected via network interface 310 may include a local area network (LAN), a wide area network (WAN), a packet data network (e.g., the Internet), mobile telephone networks (e.g., cellular networks), and wireless data networks. Computer device 300 may be connected to the networks via one or more wired connectors, such as a universal serial bus (USB), and/or one or more wireless connections, and physical jacks (e.g., Ethernet, coaxial, or phone jacks) or antennas.

The computer device 300 may further include one or more sensors 306, such as one or more of an accelerometer, a gyroscope, a global positioning system (GPS) sensor, a thermometer, a magnetometer, a barometer, a pedometer, a proximity sensor, a door sensor, an ambient light sensor, among others. The sensors 306 may include some, all, or none of one or more of the types of sensors above (although other types of sensors may also be present), as well as one or more sensors of each type. The sensors 306 can be configured to output security information at a zone of a building, such as to indicate the presence of unauthorized individuals at certain times, that a door or window is improperly left open, and/or the like. The sensors 306 may be used in conjunction with one or more user input/output (I/O) devices 308 to indicate security condition information at a user interface dashboard. The user interface can indicate whether the sensors 306 are malfunctioning, for example. The user I/O devices 308 may include one or more of a display (e.g., a touch screen display of a mobile computing device), a camera, a speaker, a keyboard, a microphone, a mouse (or other navigation device), or a fingerprint scanner, among others. The user I/O devices 308 may include some, all, or none of one or more of the types of I/O devices above (although other types of I/O devices may also be present), as well as one or more I/O devices of each type.

The computer device 300 may include different specific elements depending on the particular device. For example, although not shown, in some embodiments, computer device 300 may include a front end that incorporates a millimeter and sub-millimeter wave radio front end module integrated circuit (RFIC) connected to the same or different antennae. The RFICs may include processing circuitry that implements processing of signals for the desired protocol (e.g., medium access control (MAC), radio link control (RLC), packet data convergence protocol (PDCP), radio resource control (RRC) and non-access stratum (NAS) functionality) using one or more processing cores to execute instructions and one or more memory structures to store program and data information. The RFICs may further include digital baseband circuitry, which may implement physical layer functionality (such as hybrid automatic repeat request (HARQ) functionality and encoding/decoding, among others), transmit and receive circuitry (which may contain digital-to-analog and analog-dto-digital converters, up/down frequency conversion circuitry, filters, and amplifiers, among others), and RF circuitry with one or more parallel RF chains for transmit/receive functionality (which may contain filters, amplifiers, phase shifters, up/down frequency conversion circuitry, and power combining and dividing circuitry, among others), as well as control circuitry to control the other RFIC circuitry.

Figure 4:
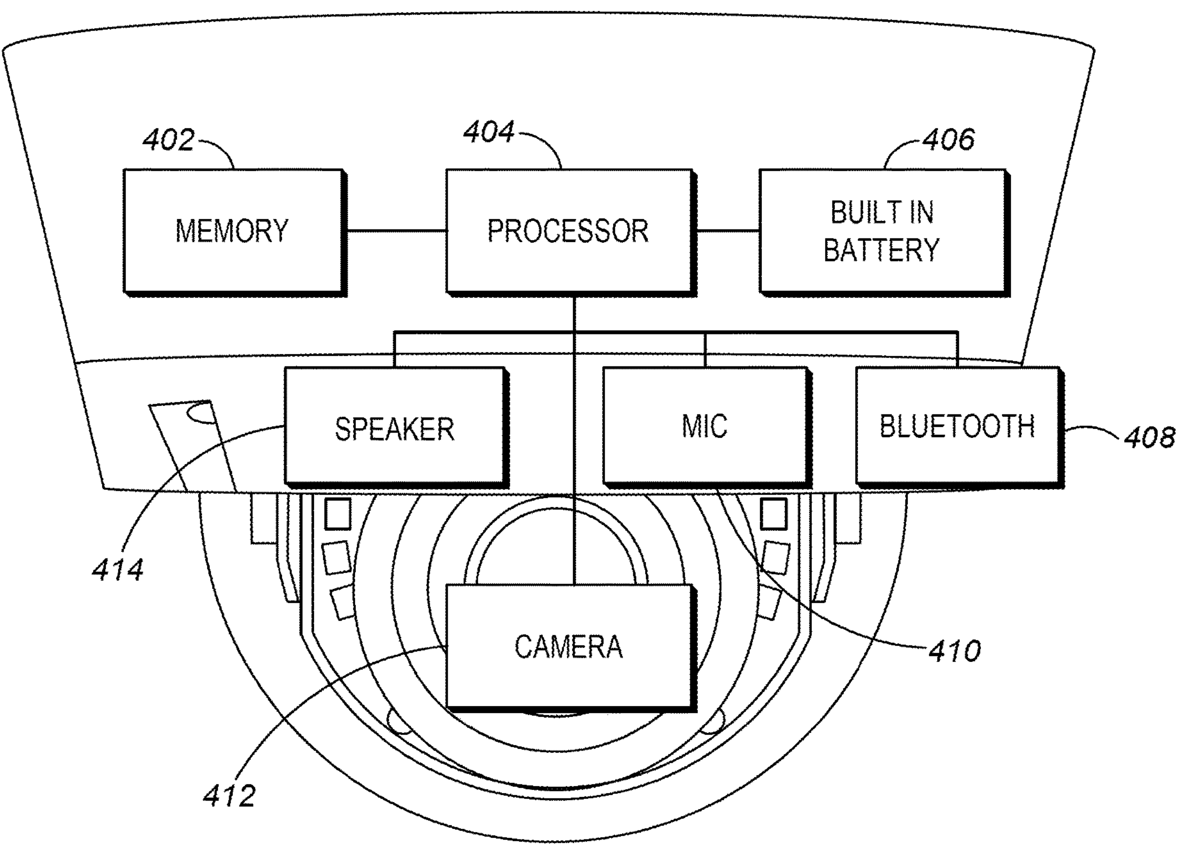
FIG. 4 depicts a camera device, in accordance with some examples.

FIG. 4 depicts a camera device 400, in accordance with some examples. The camera device 400 can have video surveillance capabilities in a CCTV mode of operation such that it operates as an image capture device prior to transitioning to a SOS notification device when an emergency incident preventing operation as CCTV is detected. As shown in FIG. 4, the camera device 400 is a video camera performing video surveillance features with components including a memory 402, a processor 404 operatively connected to the memory 402, a built in battery 406, a Bluetooth component 408, a microphone 410, an camera component 412, and a speaker 414.

The memory 402 can be configured to store data and be in operative communication with the processor 404 for executing various operations. The memory 402 may comprise volatile or non-volatile memory components, including but not limited to RAM (Random Access Memory), ROM (Read-Only Memory), flash memory, or any other suitable storage medium. The processor 404 is configured to control the operation of the camera device 400, process captured images and videos, store identity and other information about detected object, execute other algorithms for analysis and detection, and manage communication with external devices. The built in battery 406 of the camera device 400 may ensure uninterrupted operation and enhanced mobility. The built in battery 406 stores power and provides power to the various components of the camera device 400. In this way, the camera device 400 does not have to be plugged in at all time; that is, the camera device may function independently of external power sources for extended periods. The built in battery 406 may be rechargeable and designed to withstand frequent charging cycles for prolonged usage in video surveillance and other applications (e.g., SOS situations).

The Bluetooth component 408 can support wireless connectivity via short-range wireless communication (e.g., 2.4 GHz ISM frequency band) with compatible devices by the video camera device 400. The Bluetooth module 408 may enable seamless pairing with smartphones, tablets, or other Bluetooth-enabled computing/communication devices, allowing users to remotely access and control the camera device 400. Moreover, Bluetooth connectivity provided by the Bluetooth component 408 can facilitate data exchange, configuration, firmware updates, and other ad-hoc communication based capabilities. Although the camera device 400 is described as comprising the Bluetooth component 408, any other suitable wireless or wired communication method/component is also contemplated by the present disclosure. For example, the camera device 400 can use other wireless technology modalities such as Wi-Fi, Zigbee, RFID, Infared (IR communication), or Near Field Communication (NFC). As understood in the art, Wi-Fi may operate based on IEEE 802.11 standards allowing devices to communicate through access points, Zigbee may enable low-power wireless communication, RFID may enable wireless identification and tracking of objects via radio frequency (RF) signals, IR may enable wireless data communication with IR waves, and NFC may enable very short range wireless communication (e.g., devices in close proximity). The communication modalities may be used to scan for or detect first responder/rescuer devices in the vicinity.

The camera device 400 also comprises a microphone 410 and speaker 414 suite to facilitate two-way audio communication. The speaker 414 can perform playback of audio signals, including alerts, notifications, and voice messages. For example, as discussed herein, the speaker 414 can generate audible speech to provide a survival guide to trapped victims in an emergency incident scenario. The microphone 410 captures ambient sounds and user-generated audio inputs. For example, the microphone 410 can capture audio response (e.g., human speech, dog barking, tapping sound) from trapped victims to indicate their status and/or need for emergency assistance. The microphone 410 and speaker 414 may provide interactive capabilities for the camera device 400, enabling real-time communication between users and monitored areas, for example.

The camera component 412 may be a suitable high-resolution camera capable of capturing clear and detailed images and videos. As an example, the camera component 412 can utilize advanced imaging technology, including but not limited to CMOS (Complementary Metal-Oxide-Semiconductor) sensors, lenses, and image processing algorithms, to perform its image capture functionality for video capture and/or surveillance. The camera component 412 can have adjustable settings for resolution, frame rate, and exposure, such that it adapts to various lighting and environmental conditions to achieve optimal image quality and coverage.

As discussed herein, the video camera device 400 may be a CCTV video camera for capturing video footage of a specific area for surveillance or monitoring purposes. The video camera device 400 can have at least two modes of operation, including a default image capture mode of operation (e.g., image sensor used to convert light into electronic signals to capture images or video frames on the sensor's surface) and an SOS notification mode of operation (e.g., low power mode of operation that includes interactive audio conversation capabilities with victims and periodic calling for help to potential rescuers in the vicinity such as via beeper modules based on injury or health status). Such beepers or beacons can be particularly valuable for indicating the presence of trapped victims who are unconscious, for example. The video camera device 400 can be configured to detect when it is no longer capable of feasibly functioning as an image capture device and in response switching its operation to the SOS notification mode. For example, the video camera device 400 may be configured to transition to the SOS notification mode in the emergency incident scenario in order to indicate the identity, status, and the number of people it most recently captured as entering a building or a room prior to a disaster such as earthquake causing building collapse (e.g., the area that video camera device 400 was monitoring prior to the emergency incident).

To this end, the video camera device 400 can be configured to perform processing, analysis, and other manipulation of images or videos that it has captured. For example, the video camera device 400 may perform analog to digital conversion (A-D conversion) of a captured analog video signal, transmission (e.g., real-time transmission over coaxial or Ethernet cables or wirelessly to a monitoring station or recording/storage medium), and control and monitoring. For example, the video camera device 400 can have features such as pan, tilt, zoom (PTZ) functionality, motion detection, night vision (infrared illumination), and remote access for configuration and viewing via computer software, mobile apps, or web browsers. The video camera device 400 can have a fixed or unfixed 360 degree field of view (FOV). Video footage or analysis from the video camera device 400 or any other cameras connected to it can be stored for later viewing, analysis, or archival purposes such as the identity, use, and status of objects (e.g., trapped victims or important assets) in an area monitored by the video camera device 400. Thus, this information can be known and accessed for pre-accident information used for rescue efforts in case of the emergency incident occurring and trapping victims or assets.

The video camera device 400 may be connected to multiple other cameras or devices in a network, such as one that forms a security ecosystem as described herein. In this way, the security ecosystem can monitor multiple or broader areas for surveillance and monitoring. Furthermore, the video camera device 400 may perform various video analytics algorithms which may or may not include ML/AI aspects. As an example, the video camera device 400 can perform various computer vision techniques for object detection (e.g., identifying and locating objects of interest within video footage in real-time or offline). An example video object detection algorithm includes capturing an input video stream over time from a camera feed, pre-processing the frame to improve accuracy (e.g., resizing, normalization, noise reduction, color space conversion, etc.), object detection (e.g., using convolutional neural networks (CNNs) for recognizing objects by learning hierarchical features), feature extraction (e.g., to identify colors, textures, shapes and other visual characteristics for object recognition), object localization (e.g., with bounding boxes), classification (e.g., semantically labeling objects by class/type such as to identify trapped victims and critical assets), post-processing to refine results and improve accuracy, and output visualization. It will be understood that other suitable algorithms can be performed by the video camera device 400.

As discussed herein, the video camera device 400 can be configured to switch or transition from image capture mode to SOS notification mode. The switching can be based on detecting a building collapse caused by the emergency incident or other video analytics that indicate image capture is no longer feasible, practical, or possible. As an example, the video camera device 400 could comprise an accelerometer or gyrometer to detect that it is falling, which could indicate that a building collapse has occurred. Similarly, the video camera device 400 could detect unusual motion to trigger the switching to notification mode. The video camera device 400 may be configured to execute computer vision or image analytic algorithms or analyze vibration patterns that reduce false alarms for the switching of mode of operation. In general, the video camera device 400 can perform computer vision algorithm to identify and localize objects of interest within the monitored area for indications that it should transition from image capture mode to SOS notification mode. The video camera device 400 can also be programmed to recognize certain emergency or rescue event related sounds for video analytics insights, such as recognizing and analyzing a dog barking sound, an excavator sound, a chainsaw sound, a siren, a name of a rescuer, or a name of a survivor. Similarly, the video camera device 400 can recognize audio responses and users inputs of trapped victims/residents to facilitate rescue efforts to assist them.

For example, the video camera device 400 may perform video analytics on input video camera data via preprocessing, feature extraction, event detection (e.g., detecting motion, tracking objects, recognizing gestures, identifying anomalies, or detecting predefined actions such as to determine the existence of the building collapse or emergency incident generally), object recognition, pattern recognition, and contextual understanding (e.g., with additional sensor data such as audio or environmental as well as mapping or building plan architectural data). As an example, the video camera device 400 could detect a building collapse based on a continuous video feed of the camera component 412 and use motion detection such as sudden movements to flag the building collapse and object detection to differentiate between buildings, motorcycles, people, and rubble. Furthermore, the video camera device 400 could perform visual, structural, or audio analysis to indicate building instability, crashes, rumbling or other structural failures. As an example, the video camera device 400 could determine that the image feed from the camera 412 is a black image (e.g., based on true color image analytics), which could indicate that the building collapse or emergency condition has occurred. This analysis and evaluation may collectively be referred to as a detected building collapse signal or relevant video analytics in the present disclosure. It should also be noted that when the video camera device 400 transitions to the SOS notification mode based on this building collapse signal or video analytics, the microphone 410 may listen to sounds or scan for nearby first responder devices in a limited power environment at a specified cadence such as 5 or 10 minutes, which can be dependent on battery 406 power capabilities.

Figure 5A:
FIGS. 5A-5B each illustrate a security ecosystem comprising a plurality of camera devices, in accordance with some examples.
Figure 5B:
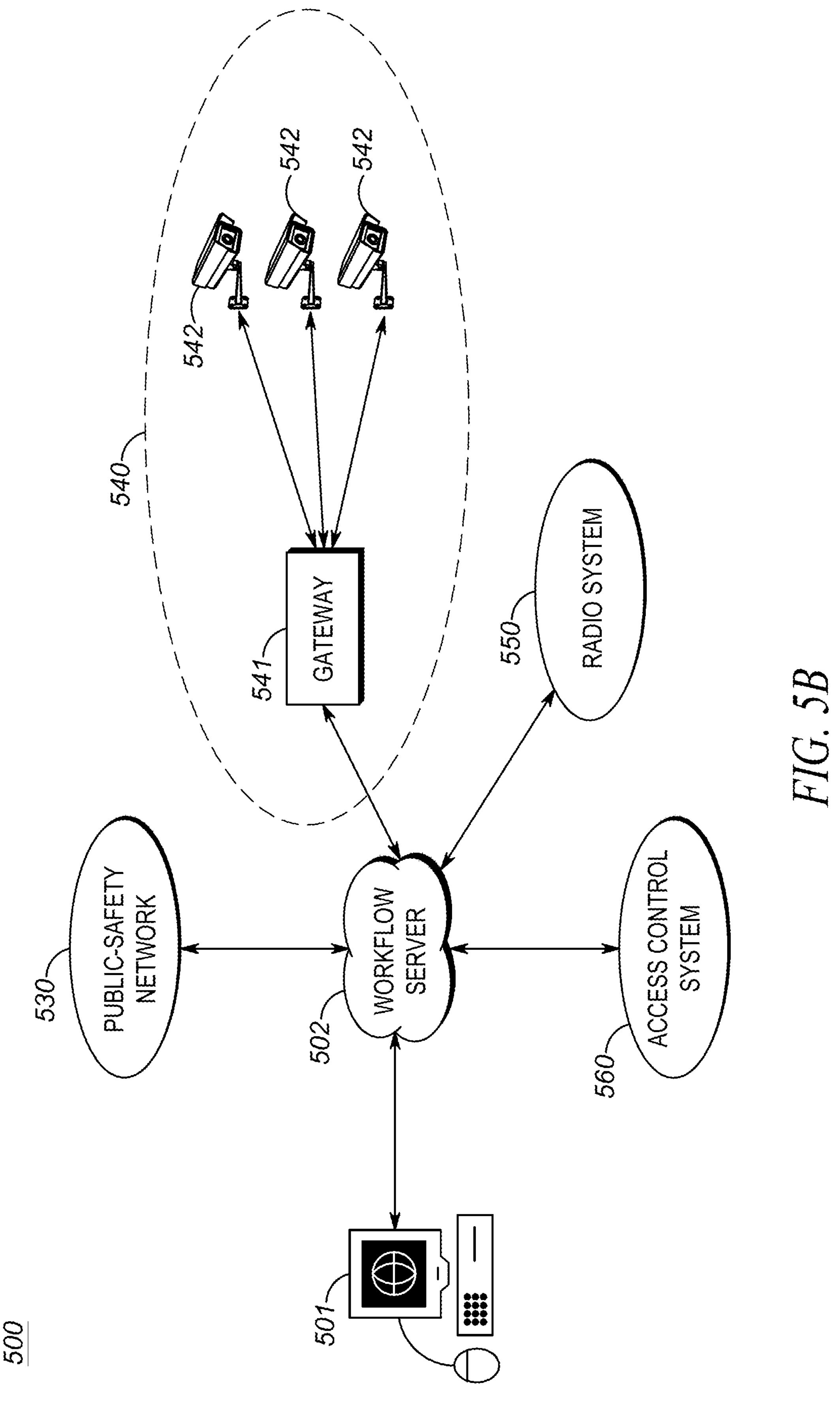

FIGS. 5A-5B each illustrate a security ecosystem 500 comprising a plurality of camera devices, in accordance with some examples. FIG. 5A illustrates the security ecosystem 500 capable of configuring and automating workflows across multiple systems. As shown, the security ecosystem 500 comprises a public-safety network 530, a video surveillance system 540, a private radio system 550, and an access control system 560. The workflow server 502 is coupled to each system 530, 540, 550, and 560. The workstation 501 is shown coupled to the workflow server 502, and is utilized to configure server 502 with workflows created by a user. It should be noted that although the components in FIG. 5 are shown geographically separated, these components can exist within a same geographic area, such as, but not limited to a building, a school, a hospital, an airport, a sporting event, a stadium, etc. It should also be noted that although only the networks and systems 530-560 are shown in FIG. 5A, one of ordinary skill in the art will recognize that many more networks and systems may be included in ecosystem 500.

The workstation 501 is preferably a computer configured to execute dispatch and incident management software. As will be discussed in more detail below, the workstation 501 is configured to present a user with a plurality of triggers capable of being detected by the network and systems 530-560 as well as present the user with a plurality of actions capable of being executed by the network and systems 530-560. The user will be able to create workflows and upload these workflows to the workflow server 502 based on the presented triggers and actions.

The workflow server 502 is preferably a server running a command center software and platform. The workflow server 502 is configured to receive workflows created by the workstation 501 and implement the workflows. Particularly, the workflows are implemented by analyzing events detected by the network and systems 530-560 and executing appropriate triggers. For example, assume a user creates a workflow on the workstation 501 that has a trigger comprising the surveillance system 540 detecting a loitering event, and has an action comprising notifying radios within the public-safety network 530. When this workflow is uploaded to the workflow server 502, the workflow server 502 will notify the radios of any loitering event detected by the surveillance system 540.

The public-safety network 530 is configured to detect various triggers and report the detected triggers to the workflow server 502. The public-safety network 530 is also configured to receive action commands from the workflow server 502 and execute the actions. In one embodiment of the present invention, the public-safety network 530 comprises includes typical radio-access network (RAN) elements such as base stations, base station controllers (BSCs), routers, switches, and the like, arranged, connected, and programmed to provide wireless service to user equipment, report detected events, and execute actions received from the workflow server 502.

The video surveillance system 540 is configured to detect various triggers and report the detected triggers to the workflow server 502. The public-safety network 530 is also configured to receive action commands from workflow server 502 and execute the actions. In one embodiment of the present invention, the video surveillance system 540 comprises a plurality of video cameras that may be configured to automatically change their field of views over time. The video surveillance system 540 is configured with a recognition engine/video analysis engine (VAE) that comprises a software engine that analyzes any video captured by the cameras. Using the VAE, the video surveillance system 540 is capable of "watching" video to detect any triggers and report the detected triggers to workflow server 502. In a similar manner, the video surveillance system 540 is configured to execute action commands received from the workflow server 502.

The radio system 550 preferably comprises a private enterprise radio system that is configured to detect various triggers and report the detected triggers to the workflow server 502. The radio system 550 is also configured to receive action commands from workflow server 502 and execute the actions. In one embodiment of the present invention, the radio system 550 comprises a MOTOTRBO™ communication system having radio devices that operate in the CBRS spectrum and combines broadband data with voice communications.

Finally, the access control system 560 comprises an IoT network. IoT system 560 serves to connect every-day devices to the Internet. Devices such as cars, kitchen appliances, medical devices, sensors, doors, windows, HVAC systems, drones, . . . , etc. can all be connected through the IoT. Basically, anything that can be powered can be connected to the internet to control its functionality. The system 560 allows objects to be sensed or controlled remotely across existing network infrastructure. For example, the access control system 560 may be configured to provide access control to various doors and windows. With this in mind, the access control system 560 is configured to detect various triggers (e.g., door opened/closed) and report the detected triggers to workflow server 502. The access control system 560 is also configured to receive action commands from the workflow server 502 and execute the action received from the workflow server 502. The action commands may take the form of instructions to lock, open, and/or close a door or window.

As is evident, the above security ecosystem 500 allows an administrator using the workstation 501 to create rule-based, automated workflows between technologies to enhance efficiency, and improve response times, effectiveness, and overall safety. The above ecosystem 500 has the capability to detect triggers across a number of devices within the network and systems 530-560 quickly take actions by automatically executing the proper procedure (i.e., executing the appropriate action once a trigger is detected).

FIG. 5A illustrates a security ecosystem capable of configuring and automating workflows. In particular, FIG. 5B shows the security ecosystem 500 with an expanded view of access control system 560. As shown, the access control system 560 comprises a plurality of IoT devices 563 coupled to the gateway 562. Data passed from the workflow server 502 to the IoT devices 563 passes through the network 561, gateway 562 and ultimately to the IoT device 563. Conversely, data passed from the IoT devices 563 to the workflow server 502 passes through the gateway 562, network 561, and ultimately to the workflow server 502.

The IoT devices 563 preferably comprise devices that control objects, doors, windows, sensors, . . . , etc. As is known in the art, a particular communication protocol (IoT protocol) may be used for each IoT device. For example, various proprietary protocols such as DNP, Various IEC**** protocols (IEC 61850 etc.), bacnet, EtherCat, CANOpen, Modbus/Modbus TCP, EtherNet/IP, PROFIBUS, PROFINET, DeviceNet, . . . , etc. can be used. Also a more generic protocol such as Coap, Mqtt, and RESTfull may also be used.

The gateway 562 preferably comprises an Avigilon™ Control Center running Avigilon's Access Control Management software. The gateway 562 is configured to run the necessary Application Program Interface (API) to provide communications between any IoT device 563 and the workflow server 502.

The network 561 preferably comprises one of many networks used to transmit data, such as but not limited to a network employing one of the following protocols: a Long Term Evolution (LTE) protocol, LTE-Advance protocol, or 5G protocol including multimedia broadcast multicast services (MBMS) or single site point-to-multipoint (SC-PTM) protocol over which an open mobile alliance (OMA) push to talk (PTT) over cellular protocol (OMA-PoC), a voice over IP (VOIP) protocol, an LTE Direct or LTE Device to Device protocol, or a PTT over IP (PoIP) protocol, a Wi-Fi protocol perhaps in accordance with an IEEE 802.11 standard (e.g., 802.11a, 802.11b, 802.11g) or a WiMAX protocol perhaps operating in accordance with an IEEE 802.16 standard.

As discussed herein, the security ecosystem 500 is capable of configuring and automating workflows. In particular, FIG. 5B shows the security ecosystem 500 with an expanded view of the video surveillance system 540. As shown, the video surveillance system 540 comprises a plurality of cameras 542 and gateway 541.

The cameras 542 may be fixed or mobile, and may have pan/tilt/zoom (PTZ) capabilities to change their field of view. The cameras 542 may also comprise circuitry configured to serve as a video analysis engine (VAE) which comprises a software engine that analyzes analog and/or digital video. The engine is configured to "watch" video and detect pre-selected objects such as license plates, people, faces, automobiles. The software engine may also be configured to detect certain actions of individuals, such as fighting, loitering, crimes being committed, . . . , etc. The VAE may contain any of several object/action detectors. Each object/action detector "watches" the video for a particular type of object or action. Object and action detectors can be mixed and matched depending upon what is trying to be detected. For example, an automobile object detector may be utilized to detect automobiles, while a fire detector may be utilized to detect fires.

The gateway 541 preferably comprises an Avigilon™ Control Center running Avigilon's Access Control Management software. The gateway 541 is configured to run the necessary Application Program Interface (API) to provide communications between any cameras 542 and the workflow server 502.

Figure 6:
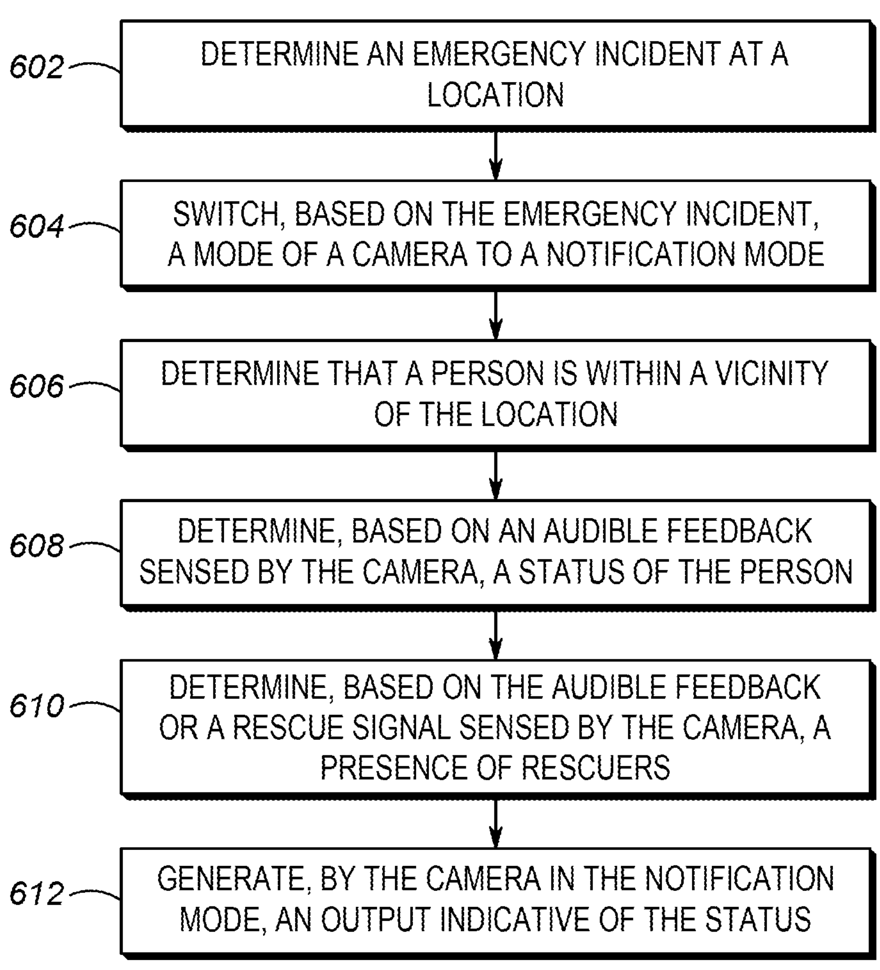
FIG. 6 is a flowchart of a method to indicate trapped people via a camera device after an emergency incident, in accordance with some examples.

FIG. 6 illustrates an example flow diagram (e.g., process 600) to improve security of a location, according to certain aspects of the present disclosure. For explanatory purposes, the example process 600 is described herein with reference to one or more of the figures above. Further for explanatory purposes, the blocks of the example process 600 are described herein as occurring in serial, or linearly. However, multiple instances of the example process 600 may occur in parallel, overlapping in time, almost simultaneously, or in a different order from the order illustrated in the process 600. In addition, the blocks of the example process 600 need not be performed in the order shown and/or one or more of the blocks of the example process 600 need not be performed.

At step 602, an emergency incident at a location may be determined. For example, detecting the emergency incident comprises determining an object and associated location parameter in a field of view of the camera. For example, detecting the emergency incident comprises detecting a collapse of a building based on a video or audio signal captured by the camera. As an example, a sensor is configured to output a building collapse signal that is indicative of the emergency incident at the location. According to an aspect, the emergency incident is a disaster affecting the location comprising a building collapse, an earthquake, a tornado, a hurricane, a flood, a tsunami, or a storm. At step 604, a mode of a camera to a notification mode may be switched based on the emergency incident. For example, switching the mode of the camera comprises operating the camera as a notification device configured to generate a distress signal based on an occurrence of the emergency incident.

At step 606, a person being within a vicinity of the location may be determined. For example, determining that the person is within the vicinity comprises determining that the person is trapped by a building collapse at the location. For example, the camera may determine, based on the audible feedback and the rescue signal, whether the person is trapped at the location and a rescuer is within a threshold distance of the person. For example, the camera may determine whether the rescuer is within a threshold distance by scanning for the rescue signal broadcast by the first responder device. As an example, whether the person is determined to be trapped is performed by scanning for the rescue signal broadcast by a first responder device. As an example, the camera is communicatively coupled to the sensor and the first responder device configured to generate the rescue signal indicating a presence of the person at the location.

At step 608, a status of the person may be determined based on an audible feedback associated with the emergency incident sensed by the camera. For example, determining the status comprises indicating at least one of: a pose of the person relative to the location, a health condition of the person, whether the person is conscious, or whether the person has been subject to a rescue event. According to an aspect, the status of the person may be determined based on audio or video information sensed by the camera. For example, determining the status comprises determining that the audio or video information indicate a rescue event. For example, determining the status comprises determining that a location parameter of the person prior to occurrence of the emergency incident corresponds to the rescue event.

At step 610, a presence of the rescuer may be determined based on the audible feedback or the rescue signal sensed by the camera. At step 612, an output indicative of the status may be generated by the camera in the notification mode. For example, generating the output comprises receiving feedback from the person or a first responder device. As an example, generating the output is indicative of the status and whether the person is trapped. As an example, generating the output comprises generating audible feedback to the person indicating the camera is configured to transmit the distress signal. As an example, generating the output comprises sending the distress signal comprising an audio message. The audio message comprises at least one of: rescue information for the rescuer in the vicinity or survival information based on the status or whether the person is trapped.

According to an aspect, the process 600 comprises determining, based on the audio or video information, an existence of a rescue object, rescue event, or a first responder device. According to an aspect, the process 600 comprises determining a presence of rescuers in the vicinity of the location. For example, audible feedback or rescue signal detected by the camera indicates the presence of rescuers. According to an aspect, the process 600 comprises determining, based on audible feedback, a quantity of trapped residents at the location and the corresponding statuses of the trapped residents. As an example, audible feedback is associated with the speech or sound produced by the person and includes speech and tapping or knocking something in response to a camera output voice prompt. According to an aspect, the audible feedback comprises at least one of: a dog barking sound, an excavator sound, a chainsaw sound, a siren, a name of the rescuer, or a name of a survivor.

As should be apparent from this detailed description above, the operations and functions of electronic computing devices described herein are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, validate digital certificates, issue tokens, and the like).

In the foregoing specification, specific examples have been described.

However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

Also, it should be understood that the illustrated components, unless explicitly described to the contrary, may be combined or divided into separate software, firmware, and/or hardware. For example, instead of being located within and performed by a single electronic processor, logic and processing described herein may be distributed among multiple electronic processors. Similarly, one or more memory modules and communication channels or networks may be used even if embodiments described or illustrated herein have a single such device or element. Also, regardless of how they are combined or divided, hardware and software components may be located on the same computing device or may be distributed among multiple different devices. Accordingly, in this description and in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together). Similarly the terms "at least one of" and "one or more of", without a more limiting modifier such as "only one of", and when applied herein to two or more subsequently defined options such as "at least one of A or B", or "one or more of A or B" should be construed to mean an existence of any one of the options in the list alone (e.g., A alone or B alone) or any combination of two or more of the options in the list (e.g., A and B together).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:

detecting an emergency incident at a location;

switching, based on the emergency incident, a mode of a camera to a notification mode;

determining that a person is within a vicinity of the location;

determining, based on an audible feedback sensed by the camera, a status of the person, wherein the audible feedback is associated with the emergency incident;

determining, based on the audible feedback or a rescue signal sensed by the camera, that a rescuer is within a threshold distance of the person trapped at the location; and generating, by the camera in the notification mode, an output indicative of the status.

2. The method of claim 1, wherein detecting the emergency incident comprises:

determining an object and associated location parameter in a field of view of the camera; and detecting a collapse of a building based on a video or audio signal captured by the camera.

3. The method of claim 1, wherein switching the mode of the camera comprises operating the camera as a notification device configured to generate a distress signal based on an occurrence of the emergency incident.

4. The method of claim 1, wherein determining that the person is within the vicinity comprises determining that the person is trapped by a building collapse at the location.

5. The method of claim 1, wherein determining the status comprises indicating at least one of: a pose of the person relative to the location, a health condition of the person, whether the person is conscious, or whether the person has been subject to a rescue event.

6. The method of claim 1, wherein generating the output comprises:

receiving feedback from the person or a first responder device; and generating, based on the feedback, an audio utterance.

7. The method of claim 1, further comprising:

determining a quantity of trapped residents at the location and the corresponding statuses of the trapped residents, wherein the audible feedback comprises at least one of:

a dog barking sound, an excavator sound, a chainsaw sound, a siren, a name of the rescuer, or a name of a survivor.

8. The method of claim 1, wherein the emergency incident is a disaster affecting the location comprising at least one of: a building collapse, an earthquake, a tornado, a hurricane, a flood, a tsunami, or a storm.

9. A system comprising:

a sensor configured to output a building collapse signal, wherein the building collapse signal is indicative of an emergency incident at a location;

a first responder device configured to generate a rescue signal indicating a presence of a rescuer at the location; and a camera comprising a processor, wherein the camera is communicatively coupled to the sensor and the first responder device and wherein the processor is configured to:

switch, based on the building collapse signal, a mode of the camera to a notification mode;

determine that a person is within a vicinity of the location;

determine, based on audible feedback sensed by the camera, a status of the person, wherein the audible feedback is associated with the emergency incident;

determine, based on the audible feedback and the rescue signal, whether the person is trapped at the location and the rescuer is within a threshold distance of the person; and generate an output indicative of the status and whether the person is trapped.

10. The system of claim 9, wherein the processor is configured to switch the mode of the camera by operating the camera as a notification device configured to generate a distress signal based on an occurrence of the emergency incident.

11. The system of claim 9, wherein the processor is configured to determine the status of the person by determining at least one of: a pose of the person relative to the location, a health condition of the person, whether the person is conscious, or whether the person has been subject to a rescue event.

12. The system of claim 9, wherein the processor is configured to determine whether the rescuer is within a threshold distance by scanning for the rescue signal broadcast by the first responder device.

13. The system of claim 9, wherein the processor is configured to generate the output by:

generating audible feedback to the person indicating the camera is configured to transmit a distress signal; and sending the distress signal comprising an audio message, wherein the audio message comprises at least one of: rescue information for the rescuer in the vicinity or survival information based on the status or whether the person is trapped.

14. The system of claim 9, wherein the processor is further configured to determine a quantity of trapped residents at the location and the corresponding statuses of the trapped residents.

15. A camera comprising:

a processor; and a computer-readable storage medium having stored thereon program instructions that, when executed by the processor, cause the camera to perform a set of operations comprising:

detecting an emergency incident at a location;

switching, based on the emergency incident, a mode of the camera to a notification mode;

determining that a person is within a vicinity of the location;

determining, based on audio or video information sensed by the camera, a status of the person, wherein the audio or video information is associated with the emergency incident and the status indicates that the person is trapped at the location and within a threshold distance of a rescuer corresponding to a rescue signal; and generating, by the camera in the notification mode, an output indicative of the status.

16. The camera of claim 15, wherein the set of operations comprising switching the mode of the camera comprise operating the camera as a notification device configured to generate a distress signal based on an occurrence of the emergency incident.

17. The camera of claim 15, wherein the set of operations comprising determining that the person is within the vicinity comprise determining that the person is trapped by a building collapse at the location.

18. The camera of claim 15, wherein the set of operations comprising determining the status comprise:

determining that the audio information indicates a rescue event; and determining that a location parameter of the person prior to occurrence of the emergency incident corresponds to the rescue event.

19. The camera of claim 15, wherein the set of operations further comprise determining, based on the audio information, an existence of a rescue object, rescue event, or a first responder device.

20. The camera of claim 15, wherein the set of operations further comprise determining a quantity of trapped residents at the location and the corresponding statuses of the trapped residents.

* * * * *